United States Patent
Lawrence

(10) Patent No.: US 8,024,251 B2
(45) Date of Patent: Sep. 20, 2011

(54) BOND ISSUE RISK MANAGEMENT

(75) Inventor: David Lawrence, New York, NY (US)

(73) Assignee: Goldman Sachs & Co., New York, NY (US)

( * ) Notice: Subject to any disclaimer, the term of this patent is extended or adjusted under 35 U.S.C. 154(b) by 215 days.

(21) Appl. No.: 12/208,009

(22) Filed: Sep. 10, 2008

(65) Prior Publication Data

US 2009/0012907 A1 Jan. 8, 2009

Related U.S. Application Data

(62) Division of application No. 10/730,224, filed on Dec. 8, 2003, now Pat. No. 7,529,702.

(60) Provisional application No. 60/434,545, filed on Dec. 19, 2002.

(51) Int. Cl.
  *G06Q 40/00* (2006.01)
(52) U.S. Cl. ........................................ 705/36 R; 705/35
(58) Field of Classification Search .................. 705/36 R
See application file for complete search history.

(56) References Cited

U.S. PATENT DOCUMENTS

| | | | |
|---|---|---|---|
| 7,216,103 B2 * | 5/2007 | Friedland et al. | ............... 705/37 |
| 2002/0016758 A1 * | 2/2002 | Grigsby | ........................ 705/36 |
| 2002/0111896 A1 | 8/2002 | Ben-Levy et al. | |
| 2002/0174060 A1 | 11/2002 | Friedland et al. | |

OTHER PUBLICATIONS

"Online Auctions!", Jul. 3, 2008, SVR:USPTO-EFXRF-5/35, DNIS: 2735588, CSID: Duration (mm-ss): 12-24, (cover 2pgs. + pp. 64-67 + pp. 80-90, total 17 pages).
"PCT International Search Report of the International Searching Authority", mailed Nov. 22, 2006, for PCT/US2003/38854, 4pgs.

* cited by examiner

*Primary Examiner* — Kirsten S Apple
(74) *Attorney, Agent, or Firm* — Chadbourne & Parke LLP; John A. Squires

(57) ABSTRACT

The present invention provides an auction system that allows bond issue sales to be offered in an open and transparent manner, wherein, a certain percentage (up to 100%) of bonds in a bond issue can be offered to qualified bidders at a "buy now" pre-auction price, set by an issuer and/or lead manager. Investors can be allowed to "bid some bonds out of the auction process" and thus guarantee their allocation and also allow bidders to participate in an open auction for other bonds. Bonds to be offered in a bond issue can include a subset of pre-auction price bonds and a subset of auction price bonds. The pre-auction price bonds are offered to pre-auction bidders at a pre-auction price, and auction bonds are generally sold to the highest bidder. Pre-auction sales can serve as a catalyst for generating enthusiasm for an associated bond issue auction.

7 Claims, 8 Drawing Sheets

```
310  RECEIVE INFORMATION RELATING TO A NEW BOND ISSUE

311  QUALIFY AS BIDDER

312  RECEIVE PRE-AUCTION PRICE

313  PURCHASE BONDS PRIOR TO AUCTION PROCESS
```

| BOND DATA 702 | PRE-AUCTION BOND BIDDERS 704 | PRE-AUCTION BOND PRICE 706 | RESERVE AMOUNT 708 |
|---|---|---|---|
| PRICE/YIELD | XYZ CORP | $###.## | $###.## |
| MATURITY | ABC INVESTOR | $###.## | $###.## |
| COUPON FEATURES | LMN INVESTOR | $###.## | $###.## |
| CONVENTION | QRS FUND | $###.## | $###.## |
| SETTLEMENT DATE | JPK FUND | $###.## | $###.## |

FIG. 7

BOND ISSUE RISK MANAGEMENT

CROSS REFERENCE TO RELATED APPLICATIONS

This is a divisional of co-pending prior U.S. patent application Ser. No. 10/730,224, filed Dec. 8, 2003, which claims benefit to U.S. Provisional Application No. 60/434,545 filed Dec. 19, 2002 and entitled "Bond Issue Risk Management".

BACKGROUND

This invention relates generally to methods and systems for facilitating management of new bond issues. In particular, the present invention relates to a methods and systems of making new bond or other fixed income instruments available through pre-auction and auction processes.

The bond markets in a country such as the United States may be the most sophisticated and regulated in the world. Nonetheless, the current system for issuing new bonds can present at least an appearance of impropriety. A conflict of interest can be perceived when an issuing manager is under pressure to sell the bond issue and favorable research is published by an entity allied with an issuing manager.

Similarly, a perceived conflict of interest can arise when a potential manager for a bond issue offers advice to a company or government entity concerning market timing. Favorable timing for an investment bank that will manage a bond issue may or may not correspond with good market timing.

What is needed therefore are methods and mechanisms to provide for issuance of bonds and other fixed income instruments in a manner that alleviates and actual or perceived conflicts of interest.

SUMMARY OF THE INVENTION

The present invention includes methods and computerized apparatus for managing issuance of a new bond. A subset of bonds that includes a bond issue is offered for sale to one or more pre-auction bidders at a pre-auction price. One or more indications is received from the one or more pre-auction bidders accepting the offer to sell one or more bonds at the pre-auction price. Information descriptive of one or more pre-auction sales of one or more bonds included in the bond issue is published and remaining bonds comprising the bond issue are auctioned.

In some embodiments, the information descriptive of the pre-auction sales of bonds comprises the pre-auction price and the pre-auction bidders. Embodiments can also include publishing the number of bonds offered at the pre-auction price and/or publishing how many bonds each pre-auction bidder has received.

Some embodiments can also include determining pre-auction bidders based upon at least one of: investor suitability, investment objectives and prior investment history.

In another aspect, some embodiments can include a pre-auction price determined by an issuer of the bonds and a lead manager for the stock.

It is also in the scope of some embodiments to make available a list, such as through online or hardcopy publication, that includes those pre-auction bidders that have previously purchased pre-auction bonds included in a bond offering managed by an investment bank involved in offering to sell the subset of bonds.

In still other embodiments, information descriptive of an investment experience related to the previously purchased pre-auction bonds included in the pre-auction price of the previously purchased pre-auction bonds can be made available through online and/or hardcopy publication.

Still other aspects of the present invention can include setting a reserve price for the initial public offering and determining a total amount to be received from accepted pre-auction offers and auction bids and conditioning sale of the bonds included in the initial public offering upon the total amount equaling or exceeding a reserve price.

In some embodiments, auctioning can include receiving one or more bids that include a price per bond and a number of bonds and allocating bonds according to a highest price per bond bid for a corresponding number of bonds until all bonds comprising the new issue have been allocated.

In still other aspects of the present invention, if more than one bid is received that includes the same price per bond, bonds are allocated for that price on a first bid received, first bonds allocated basis. Similarly, in some embodiments if more than one bid is received that includes the same price per bond, bonds are allocated for that price on pro rata basis.

In still other embodiments of the present invention, a method or system for obtaining one or more bonds in a new bond offering can include receiving information descriptive of the new bond offering, receiving an offer to obtain one or more bonds included in the new bond offering at a pre-auction price and indicating an acceptance to purchase the one or more bonds offered at the pre-auction price wherein information descriptive of one or more pre-auction sales of one or more bonds comprising the bond issue is published and remaining bonds comprising the bond issue are auctioned. In addition, some embodiments can include receiving an indication of a number of bonds available at the pre-auction price and indicating a number of bonds to be purchased at the pre-auction price.

Other embodiments can include methods and computerized apparatus for obtaining one or more bonds included in a bond offering, by receiving information descriptive of the bond offering, the information including a number of pre-auction bonds allocated to pre-auction bidders at a pre-auction price and bidding on remaining bonds included in the bond offering.

Other embodiments of the present invention can include a computerized apparatus performing various steps and functions described, executable software on a computer readable medium and executable on demand to perform the various steps and functions described, or a data signal comprising digital data with commands that are interactive with a computer apparatus to implement the inventive methods of the present invention. The computer server can be accessed via a network access device, such as a computer. Similarly, the data signal can be operative with a computing device, and computer code can be embodied on a computer readable medium.

In another aspect, the present invention can include a method and system for a user to interact with an apparatus comprising a network access device so as to implement various inventive functions. Various features and embodiments are further described in the following figures, drawings and claims.

DESCRIPTION OF THE DRAWINGS

FIG. 3A illustrates a flow of exemplary steps from the perspective of an investor that can be executed while implementing some embodiments of the present invention.

FIG. 7 illustrates an exemplary data structure that can be utilized to implement certain aspects of the present invention.

DETAILED DESCRIPTION

The present invention provides methods and systems for managing risk related to new issues of bonds, and in particular the propensity of a lead manager to positively bias research in order to promote the new issue.

Overview

A unique auction process is provided that can facilitate maximization of capital-raising opportunities; transparency on initial pricing and allocation decisions; uniform and equitable allocation decisions; operation and appearance of a process that is less vulnerable to manipulation, conflicts, tie-in arrangements and self-dealing; obviation of client demands, threats and complaints about not getting their "fair bond"; and lessened exposure to enforcement and litigation risk.

A decision to participate in a bond issue can depend upon many factors including market conditions and attributes of a particular bond. For example, the present invention can allow a potential bidder to evaluate a bond offering depending upon a calendar associated with the bond that includes holiday definitions; settlement information; an accrual period; a yield method; a day count type on which a yield calculation will be based; information describing a coupon type such as periodic; a first coupon date; a coupon maturity date; coupon frequency; a list of capitalization dates and amounts; a periodic amortization date and an amortization amount; an option type; a periodic option schedule; option start date; option strike price; option frequency; option termination date or other information.

With a decision to participate in a bond issue, the present invention provides an auction system that allows bond issue sales to be offered in an open and transparent manner, wherein, a certain percentage (up to 100%) of bonds in a bond issue can be offered to one or more qualified bidders at a "buy now" pre-auction price, set by an issuer and/or lead manager. The present invention therefore allows investors to "bid some bonds out of the auction process" and thus guarantee their allocation and also allow bidders to participate in an open auction for other bonds.

The present invention can also include allocation and pricing that is based upon demand thereby minimizing risks associated with under-pricing, kickbacks and non-level playing fields. The interests of banking, trading and investment clients can be protected in a transparent fashion with fewer inherent conflicts. Regulatory concerns can be largely addressed in a commercially acceptable manner. The present invention provides a means for regulatory and public concerns to be heeded in a practical and intelligible way. A reserve or an upset price can be set for purposes of ensuring that minimum capital raising targets are met. In some embodiments, bidders can be pre-qualified before participating to determine investor suitability, investment objectives and prior histories.

Figure 1:
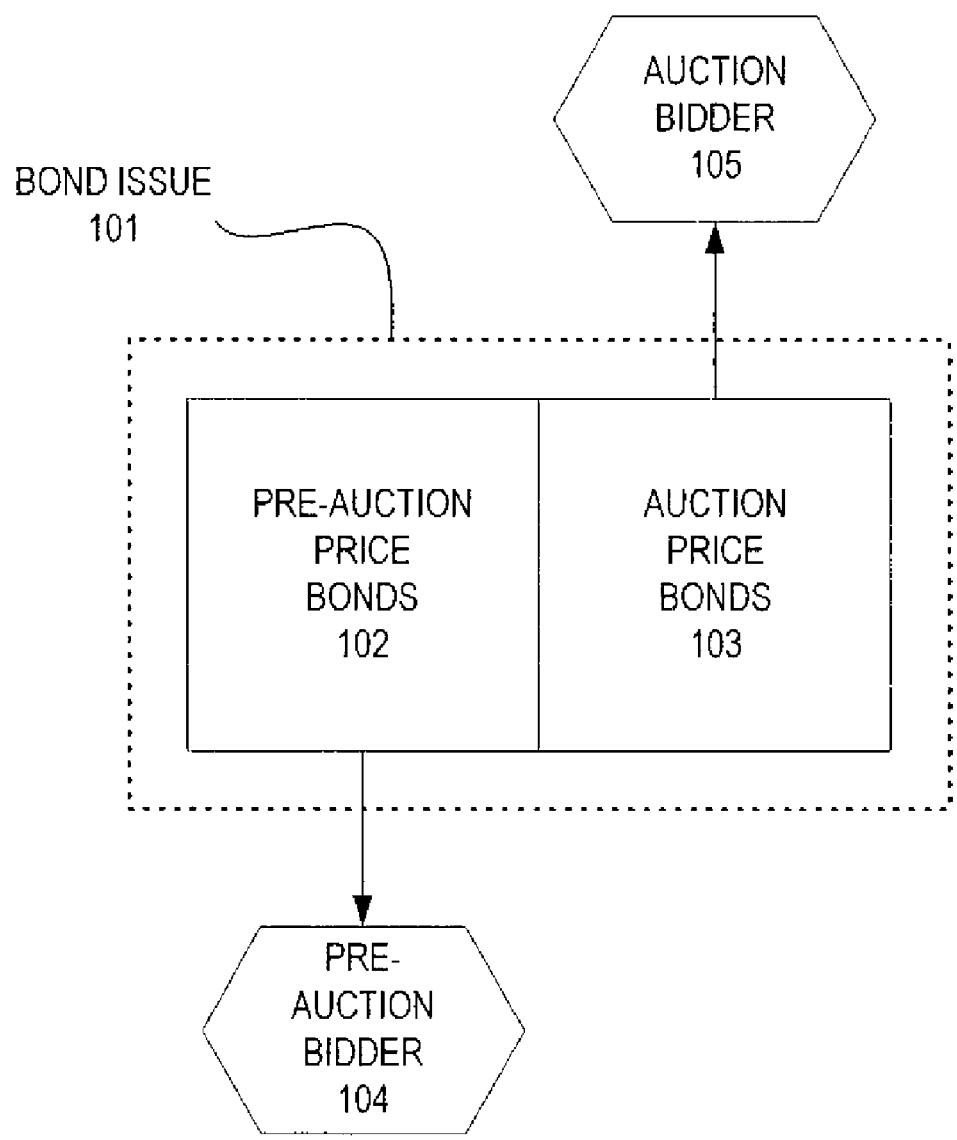
FIG. 1 illustrates block diagrams of some embodiments of the present invention.

Referring now to FIG. 1, a block diagram of one embodiment of the present invention is illustrated. Bonds to be offered in a bond issue 101 can include a subset of pre-auction price bonds 102 and a subset of auction price bonds 103. The pre-auction price bonds 102 are offered to pre-auction bidders 104 at a pre-auction price, and auction bonds are generally sold to the highest bidder. Pre-auction sales can serve as a catalyst for generating enthusiasm for an associated bond issue auction. The auction itself can be conducted using techniques similar to those known in the industry for auctioning financial instruments.

The bond issue bonds 101 can include a predetermined number of bonds that will be made public in the bond issue transaction. A reserve price or upset price to be received in return for the bond issue bonds can be set for purposed of ensuring that minimum capital raising targets are met.

The number of pre-auction price bonds 102 can be determined according to details relating to the bond issue, such as market conditions and investor interest. For example, the market may be eager to participate in a bond issue with particular variable characteristics. With investor interest in the bond issue relatively high, a subset of pre-auction price bonds 102 may be relatively low (for example, 40% of all bonds to be offered) and a lead manager is confident that auction of the auction price bonds 103 will easily generate sales sufficient to meet the reserve. In a different example, market interest may be lessened, or a reserve may seem more difficult to meet. In this example, a higher proportion of bond issue bonds 101 may be designated as pre-auction price bonds 102 and offered to significant investors with a prior history that indicates interest in a pertinent bond type, or with investment objectives that can be well served by the purchase of the pre-auction price bonds 102.

A level of participation in the sale of pre-auction bonds 102 can also serve as a benchmark for investors who have an interest in participating in the auction as auction bidders 105. Credibility associated with larger, pre-qualified pre-auction bidders 104 can generate enthusiasm for bonds included in the issue 101 that will be offered at auction. In addition, a pre-auction price for bonds 101 can be useful in determining a reasonable price to be bid during an auction.

Methods

Figure 2:
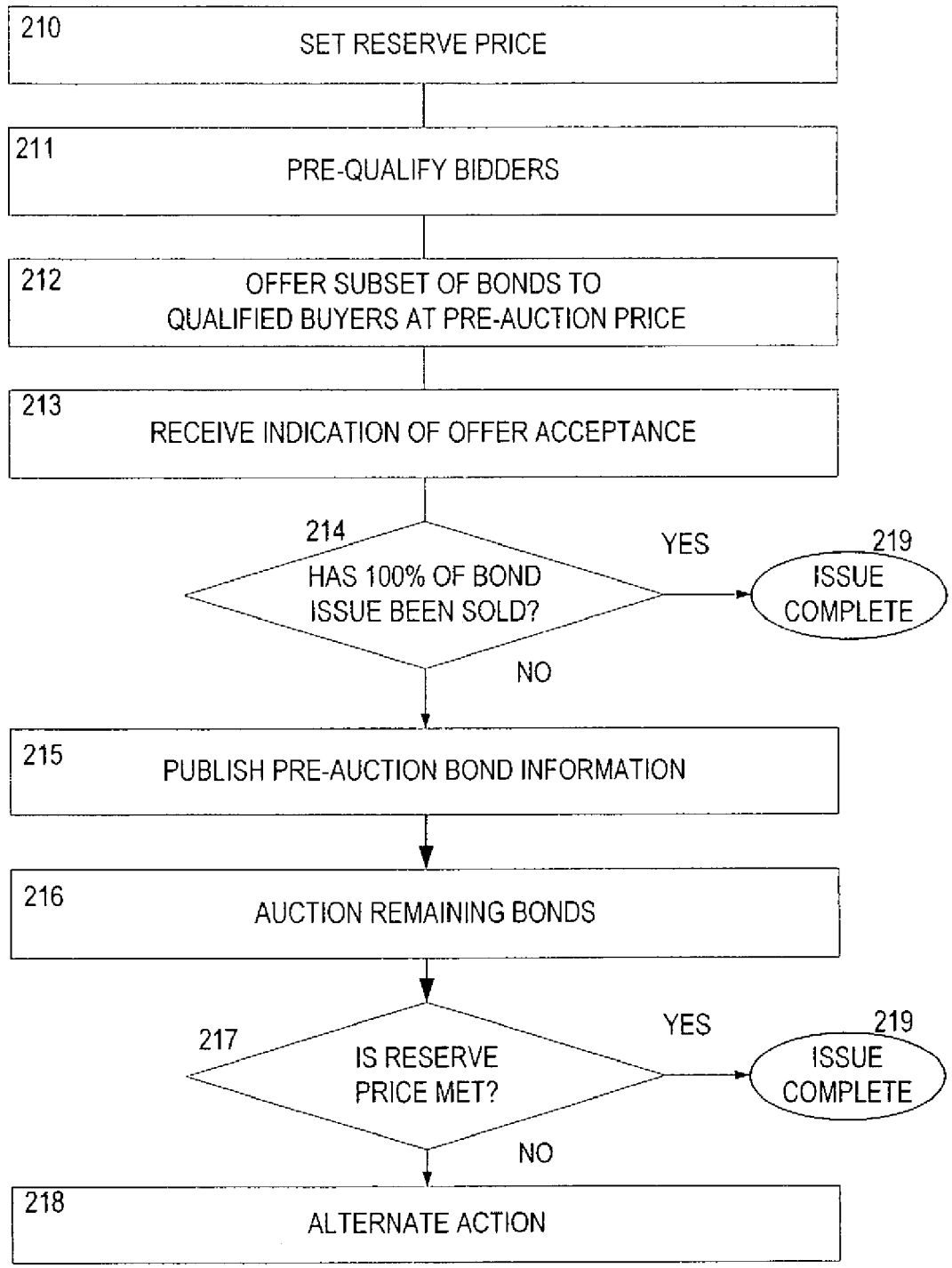
FIG. 2 illustrates a flow of exemplary steps that can be executed while implementing some embodiments of the present.

Referring now to FIG. 2, steps that can be performed while practicing the present invention are illustrated, the steps are presented as they may be practiced, although no particular order is required. Accordingly, any order should not limit the scope of the invention.

At 210 a reserve price may be set. The reserve price, or upset price, can include a threshold amount, such as a minimum capital raising target that the issuer will accept in order to complete the bond issue. The reserve amount can be determined, for example, by the issuer with the assistance of lead manager or other investment banking assistance. At 211, bidders can be pre-qualified. Pre-qualification can include, for example, determining that potential bidder(s) 104-105 meet investor suitability guidelines, that the bidder has sufficient amounts on account or available through leveraging or other credit, that the bond issue meets an investment objective of the bidder(s) 104-105, or other type of determination that would be indicative of whether a bidder should be able to participate in the bond issue.

At 212, the pre-auction price bonds 102 can be offered to one or more qualified pre-auction bidders 104 at a pre-auction price. Embodiments can include, for example, offering pre-auction bonds to select large investors which can have the added benefit of increasing the credibility of the offering, creating demand, attention and price support for the company going public. Pre-auction price bonds can be offered, for example, via an electronic communications network and trading terminals, as discussed more fully below, via hardcopy documents or any other known means of communication.

At 213, an indication of acceptance of the offer for pre-auction price bonds 102 can be received. Generally, the acceptance of the offer for pre-auction price bonds 102 allows buyers to bid bond issue bonds 101 out of the auction process and thus guarantee their allocation. The indication of acceptance can be accomplished, for example, through an electronic transaction, via execution of documents, via facsimile, voice message, or other means of communication.

At 214, it can be determined if 100% of all the bond issue bonds 101 have been sold in the pre-auction stage of the bond issue process. Embodiments can include predetermining a portion of the bond issue bonds 101 which will be allocated as pre-auction price bonds 102, which will also result in a predetermined portion to be allocated as auction price bonds 103. Other embodiments can include letting market demand for pre-auction price bonds determine what percentage, up to 100%, of the bonds will be sold at the pre-auction price. Variations can also include allocating a maximum portion of bonds to be sold at a pre-auction price and allowing qualified bidders to purchase, in aggregate, up to the maximum portion.

If 100% of the bond issue bonds have been sold, the bond issue process can be completed at 219.

If 100% of the bonds have not been sold, then at 215 an auction can proceed with publication of pre-auction bond information. The publishing pre-auction bond information can include, for example: a number of bonds that were sold at a pre-auction price, identification of the bidders who purchased bonds at the pre-auction price, a number of bonds purchased by each bidder at the pre-auction price, additional offers to purchase bonds at the pre-auction price which were not granted, or other related information.

At 216, any bond issue bonds that have not been sold at the pre-auction price can be auctioned. An auction of bond issue bonds 101 can be conducted by adapting known auction techniques suitable for auctioning financial instruments. For example, in some embodiments, a bond issue auction can include receiving multiple bids and determine a clearing bid price at which all bonds included in the offering will sell. Embodiments can include a clearing price being set as the maximum price at which bids will sell. Utilizing a clearing bid price, bonds can be allocated to all bidders who bid at or above the clearing price. Embodiments can also include allocating bonds to a highest bidder first and then to each subsequent next highest bidder until all of the bond issue bonds are allocated. Still other embodiments can include a pro rata bond allocated to each bidder who bids above a threshold bid amount. A unique aspect of some auctions embodying the present invention is the ability of auction participants to view data showing pre-auction interest including who purchased bonds at a pre-auction price, what the per-auction price was, and how many bonds were sold at the pre-auction price. Substantial pre-auction activity can act to "prime the pump" and create interest during the auction, as well as add to due diligence on the part of auction participants. Embodiments can include auction models that build upon the demand created by the pre-auction activity and include such features as: publication of bids to create competitive bidding, bidding until a cutoff time, bidding until a threshold amount is reached, bidding until each registered bidder has placed a bid.

At 217, embodiments can include a determination of whether a reserve price has been met by selling bonds during the auction and pre-auction sales. If the reserve has been met, the bond issue process can be completed at 219. If the reserve has not been met, than some alternate action can be considered. For example, if the bond issue is a best efforts deal, the bond issue may be cancelled if the lead manager cannot sell all of the bonds. Accordingly, the lead manager may be given the opportunity to sell remaining bonds, or to sell some bonds at a price higher than the price bid. Actions may also include, for example, accepting a reduced value, not taking the company public, or other action.

Referring now to FIG. 3A, steps that can be performed, from a pre-auction buyer's 104 viewpoint, while practicing the present invention are illustrated. At 310, pre-auction buyer 104 can receive information relating to a public offering. The information can include, for example, a prospectus relating to the offering, including, a red herring prospectus, a final prospectus, SEC filings, press coverage of the company, press coverage of the offering, analyst statements, information descriptive of company officers or other significant people, financial data relating to the company, a mission statement, or other data. In some embodiments, information relating to the bond issue can include a risk management search conducted by a risk management clearinghouse.

Information relating to a bond that will be issued can include, for example: the bond's issue date; settlement date; ex-dividend date; accrual information; price; yield; payment periods; a bond's price-yield relationship; its maturity, redemption features; coupons; type of coupon involved; coupon features; the convention in the underlying market; associated step ups; the bond's yield calculation method; capitalization; amortization; step up date; value recovery right; option schedule; any rolling guarantee information; or other information descriptive of the bonds to be issued. A bidder 105 can receive information relating to the public offering. In some embodiments, information relating to the bond issue can include a risk management search conducted by a risk management clearinghouse.

At 311, pre-auction buyer 104 can qualify as a bidder. Qualification can include standard industry practices for opening a financial investment account and making the investor known to an entity associated with conducting the auction. In addition, qualification can include arranging for credit lines or other means of securing a bid made during an auction. Qualification as a buyer can be accomplished by procuring data descriptive of the buyer and ascertaining that the buyer meets statutory and/or compliance criteria. Data can be received by inputting data into an online form, submitting hardcopy or facsimile documents, via voice communication, or other means of communication.

At 312, the pre-auction buyer 104 can receive the pre-auction price for bonds of the bond issue and at 313; the pre-auction buyer 104 can bid for the bond issue bonds and purchase the bonds at the pre-auction price. Communication of the pre-auction price for bonds and a bid for the bonds at the pre-auction price can be made via an electronic trading system, via an electronic messaging system, via hardcopy or facsimile documents, via a voice communication, or other communications means.

Figure 3B:
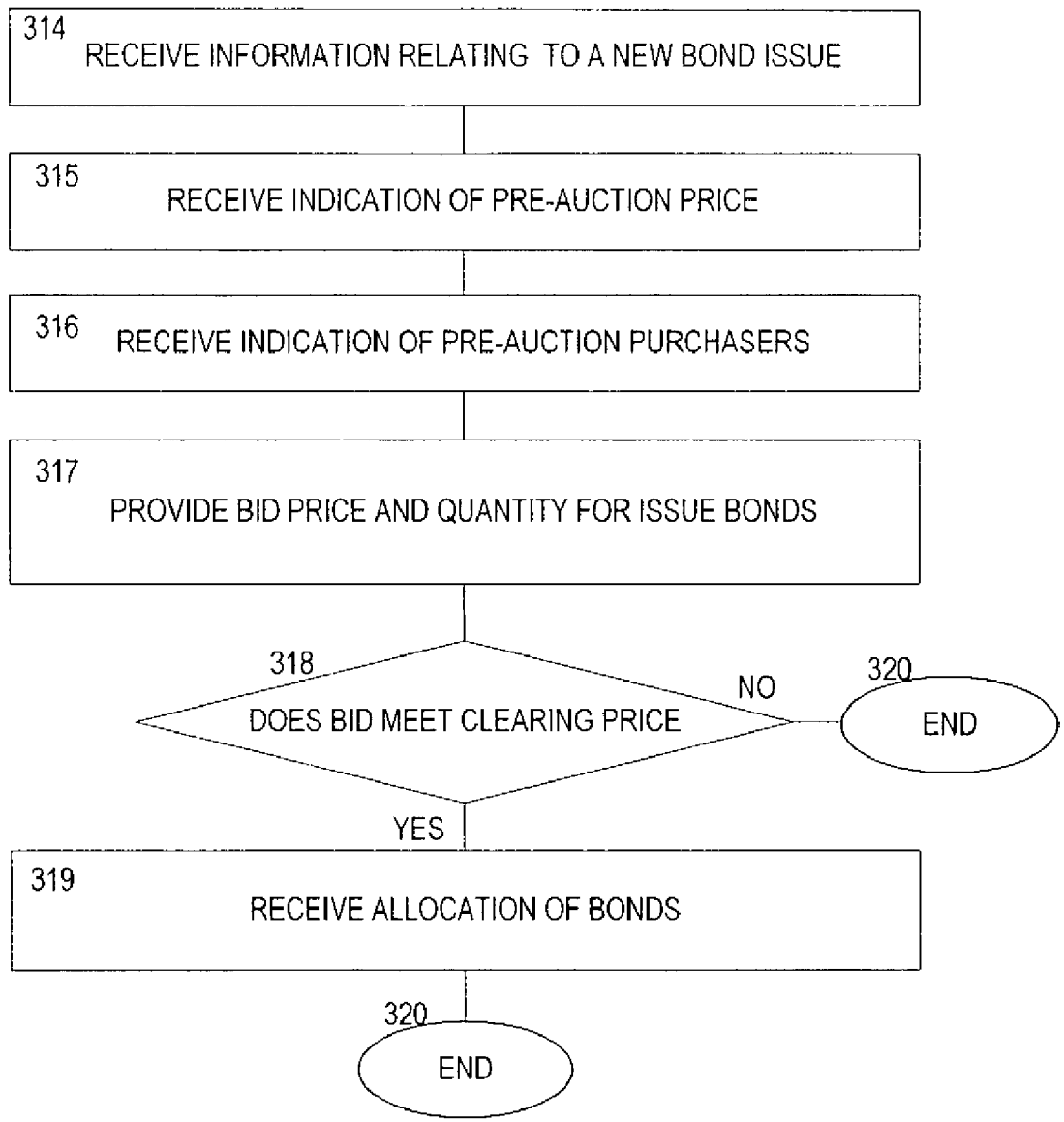
FIG. 3B illustrates a flow of exemplary steps from the perspective of an auction participant that can be executed while implementing some embodiments of the present invention.

Referring now to FIG. 3B, steps that can be performed while practicing the present invention, from the perspective of an auction bidder 105, are illustrated. At 314, the bidder 105 can receive information relating to the public offering, such as that information described above.

At 315, the bidder 105 can receive an indication of the pre-auction price, and at 316 receive an indication of who constituted the pre-auction price bidders 104. The indications of the pre-auction price and pre-auction bidders 104 can be conveyed via an online resource, such as a web page, via an electronic message, via a hardcopy or facsimile, via a voice message or other communications means. The indications can include information setting forth a number of bonds purchased by each pre-auction bidder 104. In some embodiments, an auction bidder 105 can include the information descriptive of pre-auction bids as part of the auction bidders 105 due diligence and value assessment concerning the auction price bonds 103. For example, it may be convincing to a potential bidder for respected investment entities to have purchased large numbers of bonds in the bond issue. It may also be useful to the auction bidders, in determining an appropriate bidding price, to know the pre-auction price paid by the pre-auction buyers 104.

At 317, the bidder 105 can provide a bid price for the bond issue bonds as well as a quantity of bonds 103 for which the bidder 105 is bidding. The bidder 105 can convey a bid via an electronic trading system, by entering data into a graphical user interface, via hardcopy or facsimile document, via a voice communication, or other means of communication.

At 318, it can be determined if the bid meets a clearing price. The clearing price can include a minimum acceptable bid price that qualifies for receiving bond issue bonds. Embodiments can include, for example, a computerized system that receives a bid amount and automatically compares the amount to other bid prices and responds with an indication of whether the bid meets a minimum price to qualify for receiving auction price bonds 103 included in the bond issue.

At 319, if a bid does meet the clearing price the bidder 105 can receive an allocation of bonds from the bond issue. Allocated bonds can include, for example, all auction price bonds bid for at an acceptable price, a number of bonds based upon a pro rata allocation of bonds awarded to any bid received which at least meets a given price, or any other given method of allocation. The bonds can actually be received through any method or vehicle known to the industry for delivering ownership of a fixed income instrument.

Systems

Figure 4:
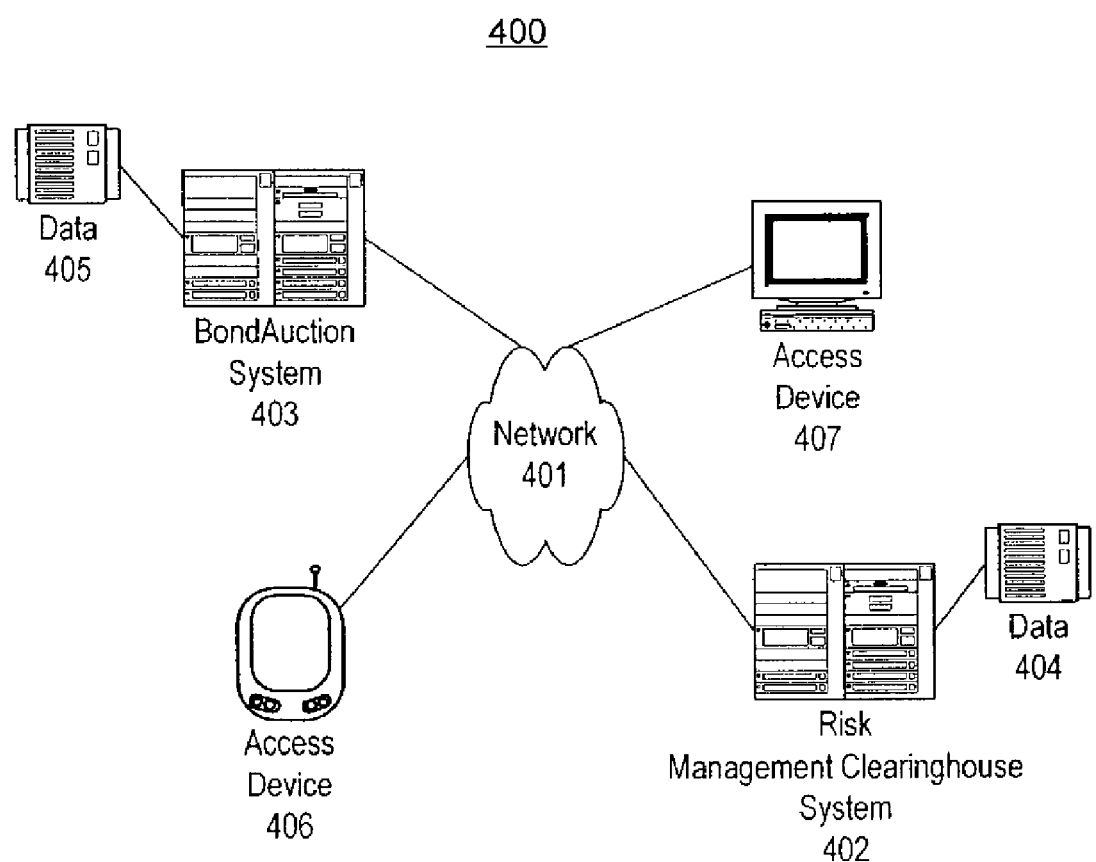
FIG. 4 illustrates a network of computer systems that can be included in some embodiments of the present invention.

Referring now to FIG. 4, a network diagram illustrating one embodiment of the present invention is shown 400. An automated bond issue auction system 403 can include a computerized server accessible via a distributed network 401 such as the Internet, or a private network. An automated RMC system 402 can also include a computerized server accessible via the distributed network 401. A user can use a computerized system or network access device 406-407 to receive, input, transmit or view information processed in the bond issue auction system 403, RMC system 402, a peer device, or other network access device 406-407. A protocol, such as, for example, the transmission control protocol internet protocol (TCP/IP) can be utilized to provide consistency and reliability.

A system access device 406-407 can communicate with the bond issue auction system 403 or RMC system 402 to access data and programs stored at the respective servers. A system access device 406-407 may interact with the bond issue auction system 403 or RMC system 402 as if the servers were a single entity in the network 400. However, the bond issue auction system 403 and RMC system 402 may include multiple processing and database sub-systems, such as cooperative or redundant processing and/or database servers that can be geographically dispersed throughout the network 400.

Figure 5:
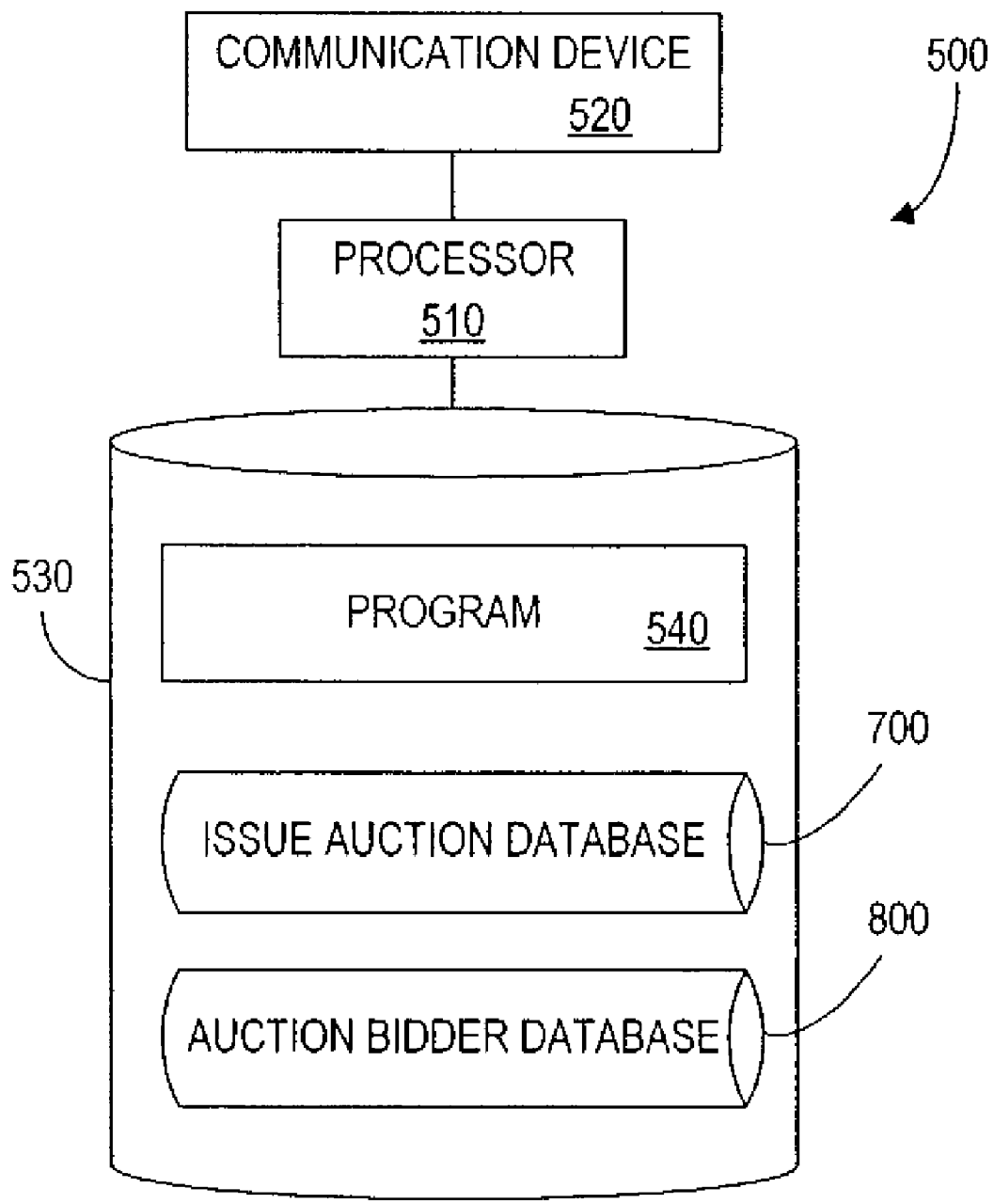
FIG. 5 illustrates a computerized device that can be utilized to implement some embodiments of the present invention.

A server utilized in a RMC system 402 and bond issue system 403 can include a processor, memory and a user input device, such as a keyboard and/or mouse, and a user output device, such as a display screen and/or printer, as further detailed in FIG. 5. The server can also include one or more databases 404-405 storing data relating to a bond issue, bidders, associated risks, or other pertinent information. Information relating to and included in a bond issue offering can be aggregated into a searchable data storage structure. Gathering data into an aggregate data structure 404-405, such as a data warehouse, allows a server to have the data readily available for processing a risk management search associated with a company's earnings. Aggregated data 404-405 can also be scrubbed or otherwise enhanced to aid in searching.

Typically, an access device 406-407 will access a bond issue system using client software executed at the system access device 406-407. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from a server to the system access device 406-407 and executed at the system access device 406-407 as part of a bond issue allocation system. Other implementations include proprietary software installed from a computer readable medium, such as a CD ROM. The invention may therefore be implemented in digital electronic circuitry, computer hardware, firmware, software, or in combinations of the above. Apparatus of the invention may therefore be implemented in a computer program product tangibly embodied in a machine-readable storage device for execution by a programmable processor; and method steps of the invention may be performed by a programmable processor executing a program of instructions to perform functions of the invention by operating on input data and generating output.

FIG. 5 illustrates a controller 500 that is descriptive of the access devices shown, for example, in FIG. 4 according to some embodiments of the present invention. The bond issue controller 500 included in the bond auction system 403 can comprise a processor 510, such as one or more processors, coupled to a communication device 520 configured to communicate via a communication network (not shown in FIG. 6). The communication device 520 may be used to communicate, for example, with one or more network access devices 406-407 or the RMC system 402.

The processor 510 is also in communication with a storage device 530. The storage device 530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 530 can store a program 540 for controlling the processor 510. The processor 510 performs instructions of the program 540, and thereby operates in accordance with the present invention. For example, the processor 510 may receive information descriptive of a bond issue including auction and pre-auction details and allocate bonds according to rules defined by the details. The processor 510 may also transmit information comprising bond allocation, pricing, or other information.

The storage device 530 can store bond issue related data in a first database 700 and bidder information in a second database 800, and other data as needed. The illustration and accompanying description of the bond issue related database presented herein is exemplary, and any number of other database arrangements can be employed besides those suggested by the figures.

Figure 6:
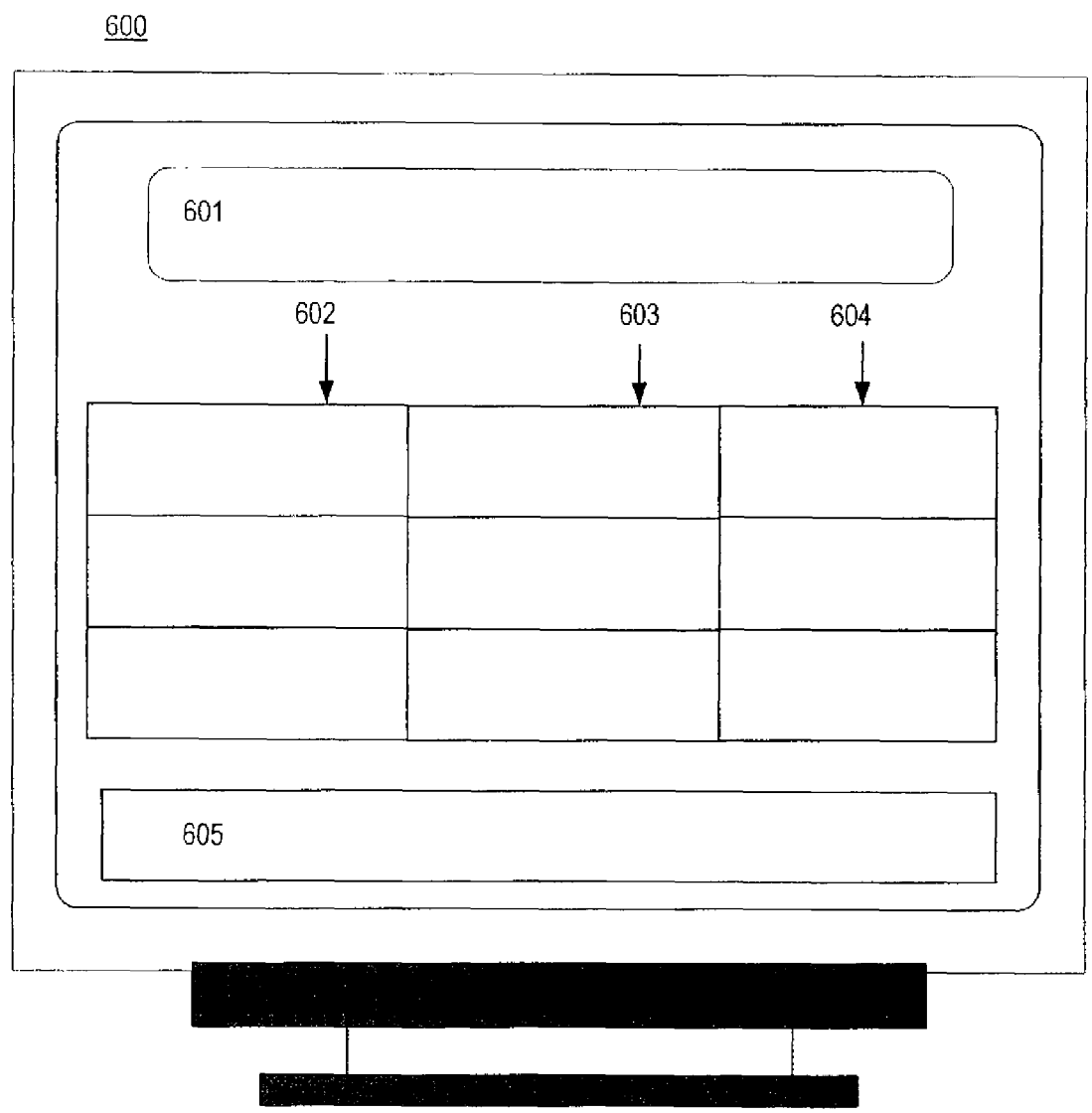
FIG. 6 illustrates an exemplary graphical user interface that can implement various aspects of the present invention.

Referring now to FIG. 6, an exemplary GUI 600 that can be utilized while practicing the present invention is illustrated. The GUI can be presented on a network access device 406-407 or any other type of terminal or interactive station capable of creating a display pursuant to an electronic signal. A portion of display 601 can display information descriptive of a bond issue, such as for example, the bond's issue date; settlement date; ex-dividend date; accrual information; price; yield; payment periods; a bond's price-yield relationship, its maturity, redemption features; coupons; type of coupon involved; coupon features; the convention in the underlying market; associated step ups; the bond's yield calculation method; capitalization; amortization; step up date; value recovery right; option schedule; any rolling guarantee information; or other information descriptive of the bonds to be issued.

Another portion of the display 602 can include information descriptive pre-auction pricing and pre-auction bids and/or sales. Still another portion 603 can contain information descriptive of pre-auction bidders and a portion 604 can display instructions relating to bidding for auction price bonds offered in the bond issue. Portions of the display 600 can also be interactive, and allow a user to input data, such as data descriptive of a bid 605 that include a bid amount and a number of bonds bid on at the bid amount.

Referring now to FIG. 7, a design of a portion of database that can be utilized while implementing the present invention is illustrated, the data base can include a hierarchical, relational or other structure well known in the arts. The database 700 can include a field containing data descriptive of a bond data 702 as well as a field containing data descriptive of a pre-auction bidders 704 and a pre-auction bond price 706. Another field can hold data descriptive of a reserve amount 708. Obviously, other data fields storing data utilized in various facets of the present invention can also be included. The data can be arranged and accessed using any known data storage and accessing techniques.

Embodiments of the present invention can include a computerized system, executable software, or a data signal implementing the inventive methods of the present invention. The computer server can be accessed via a network access device, such as a computer. Similarly, the data signal can be operative with a computing device, and computer code can be embodied on a computer readable medium.

Accordingly, other embodiments are within the scope of the following claims.

What is claimed is:

1. A processor-implemented method of obtaining one or more bonds comprising a bond offering, the method comprising:
   receiving via a processor information descriptive of the bond offering including suitable pre-auction participatory credit criteria;
   determining bidder qualification based on the pre-auction participatory credit criteria;
   receiving an offer to obtain one or more bonds comprising the bond offering at a pre-auction price; and
   indicating an acceptance to purchase the one or more bonds offered at the pre-auction price, wherein information descriptive of one or more pre-auction sales of one or more bonds comprising the bond issue is published and remaining bonds comprising the bond issue are auctioned after said one or more pre-auction sales.

2. The method of claim 1 additionally comprising the steps of: receiving an indication of a number of bonds available at the pre-auction price; and indicating a number of bonds to be purchased at the pre-auction price.

3. A method of obtaining one or more bonds comprising a bond offering, the method comprising:
   receiving via a processor information descriptive of the bond offering including a total number of bonds including suitable pre-auction participatory credit criteria;
   determining a number of pre-auction bonds allocated to pre-auction bidders at a pre-auction price; and bidding on remaining bonds comprising the bond offering after said one or more pre-auction sales.

4. A computerized apparatus for allocating bonds comprising a bond offering, the system comprising:
   a computer server accessible with a system access device via a communications network; and executable software stored on the server and executable on demand, the software operative with the server to cause the server to:
   determine bidder qualification based on pre-auction participatory credit criteria;
   offer a subset of the bonds comprising the bond offering to one or more qualified pre-auction bidders at a pre-auction price;
   receive an indication from the one or more pre-auction bidders accepting the offer for the bonds at the pre-auction price;
   publish information comprising the pre-auction price and the pre-auction bidders accepting the offer for bonds at the pre-auction price; and auction the remaining bonds after said one or more pre-auction sales.

5. Computer executable program code residing on a computer-readable medium, the program code comprising instructions being operative with a computer for causing the computer to:
   determine bidder qualification based on the pre-auction participatory credit criteria;
   offer a subset of the bonds comprising the bond offering to one or more qualified pre-auction bidders at a pre-auction price;
   receive an indication from the one or more pre-auction bidders accepting the offer for the bonds at the pre-auction price;
   publish information comprising the pre-auction price and the pre-auction bidders accepting the offer for bonds at the pre-auction price; and auction the remaining bonds after said one or more pre-auction sales.

6. A computer data signal embodied in a digital data stream comprising data relating to an initial public offering of bonds of stock, wherein the computer data signal comprises instructions operative with a computer to implement a method comprising the steps of:
   determine bidder qualification based on pre-auction participatory credit criteria;
   offering a subset of the bonds to one or more qualified pre-auction bidders at a pre-auction price;
   receiving an indication from the one or more pre-auction bidders accepting the offer for the bonds at the pre-auction price; and
   publishing information comprising the pre-auction price and the pre-auction bidders accepting the offer for bonds at the pre-auction price after said one or more pre-auction sales.

7. A method of interacting with a network access device so as to participate in an initial public of bonds of stock, the method comprising the steps of:
   receiving digital informational data into memory at the network access device, the information data being descriptive of the initial public offering and bidder qualification data meeting suitable pre-auction participatory criteria;

determining bidder qualification based on the pre-auction participatory credit criteria;

receiving at the network access device digital data descriptive of an offer for one or more bonds comprising the bond offering, wherein the bond is available at a pre-auction price; and using a network access input device, generating an indication of an acceptance to purchase the one or more bonds offered at the pre-auction price derived from bidder qualification data, wherein information descriptive of one or more pre-auction sales of one or more bonds comprising the bond issue is published and remaining bonds comprising the bond issue are auctioned after said one or more pre-auction sales.

* * * * *